Figure 1:
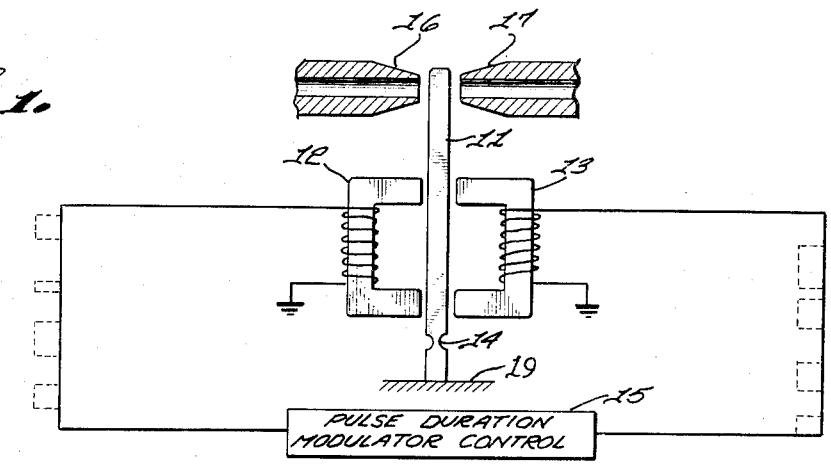

Nov. 2, 1965         G. P. CARVER         3,215,162
BISTABLE CONTROL VALVE
Filed April 20, 1962

INVENTOR.
GEORGE P. CARVER
BY John R. Faulkner
John A. Duffy
ATTORNEYS

3,215,162
BISTABLE CONTROL VALVE
George P. Carver, Balboa, Calif., assignor to Ford Motor
Company, Dearborn, Mich., a corporation of Delaware
Filed Apr. 20, 1962, Ser. No. 189,030
4 Claims. (Cl. 137—625.44)

This invention relates to solenoid actuated control valves and more particularly to a single stage valve for controlling the relative rates of flow through a pair of outlet ports.

Solenoid actuated control valves for regulating relative rate of fluid flow are in wide use and well known in the art. In order to control large amounts of fluid flow control valves are customarily of several stages and include a pilot stage. One such valve, the conventional reed valve, includes at least two stages with the main stage having the working fluid entering the valve through a pair of oppositely disposed control jets with the movement of the control jets controlling the main stage valve. Such valves are necessarily complicated in design because of the several stages required with precision design requirements and many moving parts. Additionally, due to small ports impurities in the fluid flowing through the valve often cause the valve to malfunction.

The extremely high precision and reliability requirements of valves for use in aerospace applications create the requirement for a solenoid actuated control valve which is simple and reliable in addition to meeting strict accuracy requirements. Accordingly, it is an object of this invention to provide a simple and reliable solenoid actuated control valve.

The solenoid actuated control valve of this invention contemplates as a material feature thereof a control valve having a supply port and a pair of oppositely disposed outlet ports with a flapper mounted in flapping relation within the cavity of the valve for controlling the relative rates of fluid flow through the outlet ports. Electrical means are provided for cycling the flapper in accordance with an electrical control signal whereby the flapper dwells on respective ones of the outlet ports to control the fluid flow through the outlet ports. In this manner, simplicity and reliability are realized by the use of a single stage control valve, with the flapper being the single moving part. Precision, accuracy, and reliability result from the use of the flapper to control the flow from a supply port through the pair of oppositely disposed outlet ports which may be of sufficient size to pass impurities in the fluid.

It is a further object of this invention to provide an improved single stage solenoid actuated control valve.

It is therefore another object of this invention to provide a single stage solenoid actuated control valve in which a flapper is utilized to provide bistable operation of fluid from a supply port through a pair of outlet ports.

It is another object of this invention to provide a solenoid actuated bistable control valve of flapper configuration.

Figure 2:
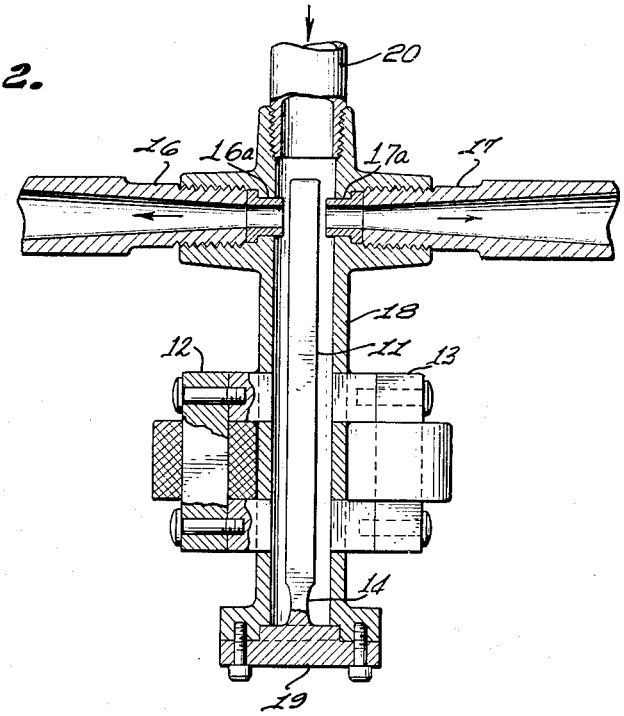
Figure 3:
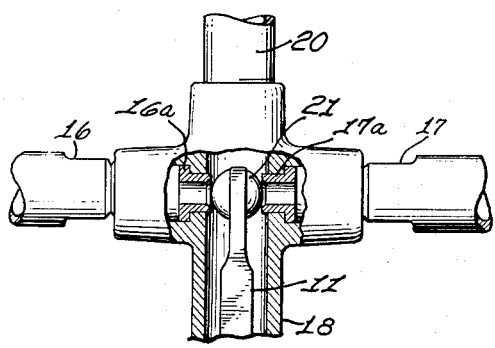

Other objects of invention will become apparent from the following description read in conjunction with the accompanying drawings, in which:

FIG. 1 is a schematic diagram illustrating the operation of the solenoid actuated valve of the invention, FIG. 2 is a sectional view of the principal embodiment of the invention, and FIG. 3 is a sectional view of an alternative embodiment of the invention.

According to a principal aspect of the invention, a single stage solenoid actuated control valve is provided in which a magnetically permeable flapper alternately dwells on the valve seats of a pair of oppositely disposed outlet ports. Electrical means including a pulse time modulator provides control signals to an electromagnet which in turn causes the flapper to alternately dwell on the valve seats of the outlet ports in direct relation to the pulse duration of the electrical signal from the time modulator.

According to a further aspect of the invention the flapper has a spherical poppet configuration to insure proper seating against the outlet ports.

Referring now to FIG. 1, a schematic diagram illustrating the principles of operation of the control valve of the invention, the valve has a single moving part, a flapper 11, which is flexibly mounted between two opposing outlet ports 16 and 17. A pair of electromagnets 12 and 13 controlled by a pulse time modulator 15 cause the flapper 11 to alternately dwell on the seats of the ports 16 and 17. Control of the relative rate of fluid flowing through the ports 16 and 17 is achieved by increasing the dwell time of the flapper 11 in one of the seats of the ports 16 and 17 and decreasing it for the other. This control is in accordance with the electrical pulse signals fed to the electromagnets 12 and 13 by the pulse time modulator 15. For example, should the duration of the pulses received by the electromagnet 12 exceed the duration of the pulses received by the electromagnet 13, the flapper 11 would be caused to dwell on the seat of the port 16 for a longer time than on the seat of the port 17 for each complete cycle. In this manner, a differential fluid flow through the ports 16 and 17 is achieved directly proportional to the control signals from the pulse time modulator 15. With a zero control signal the dwell time on each of the ports is equal producing an equal rate of fluid flow through the ports 16 and 17.

Referring now to FIG. 2, a sectional view of the principal embodiment of the invention, there is shown a solenoid actuated single stage control valve in which a valve housing 18 has a substantially cylindrical open ended cavity extending lengthwise therein. A supply or inlet port 20, threaded in the main base of the housing 18, communicates with the open end of the cavity and is adapted to be connected to a source of fluid pressure. The outlet ports 16 and 17 are oppositely disposed on the sides of the cavity of the housing 18 with each port having a valve seat 16a and 17a respectively. The flapper 11 is fixedly supported to the housing 18 at closed end 19 and has its opposite end free and extending between the valve seats 16a and 17a. The flapper 11 may be made of iron or similar ferromagnetic material and has a spring rate whereby the flapper is normally centered between the seats 16a and 17a. A reduced neck 14 near the fixed end of the flapper 11 acts as a centering spring or flexure for the flapper 11. The electromagnets 12 and 13 are oppositely poled and attached to the housing 18 and disposed with relation to the flapper 11 to cause the flapper to travel at a distance on each side of its center position to completely dwell on seats 16a and 17a depending upon which of the magnets 12 and 13 is receiving an electrical pulse from the time modulator 15.

In operation of the valve of FIG. 2 working fluid enters the inlet port 20 from whence it divides flowing through the outlet ports 16 and 17. Upon receipt of a pulse by the electromagnet 12 from the time modulator 15 of FIG. 1, the flapper 11 is caused by solenoid action to dwell on the seat 16a preventing flow of fluid through the port 16. Fluid then flows through the outlet port 17. At the conclusion of the pulse to the electromagnet 12 and upon receipt of a pulse by the electromagnet 13 the flapper 11 dwells on the seat 17a preventing the flow of fluid through the outlet port 17 and allowing fluid to flow through the outlet port 16. Thus, the relative rate of fluid flow through the ports 16 and 17 is directly proportional to the amount of dwell time of the flapper 11 on the respective seats 16a and 17a. A bistable operation is thus achieved wherein fluid is either flowing out of the port 16 or out of the port 17 depending upon which of the valve seats 16a or 17a the flapper 11 is dwelling on. With a hard over signal the flapper 11 may be caused to dwell on one of the valve seats 16a or 17a permanently, completely shutting off the flow to the respective outlet ports with full flow being realized at the other outlet port.

For certain applications such as high temperature operations, in order to fully insure the proper seating of the flapper 11 upon the valve seats 16a and 17a, the flapper 11 may be provided with a spherical poppet or ball 21 as illustrated in the alternative embodiment of FIG. 3. The poppet 21 is designed to seat tight with pressure loading in order to prevent wire drawing or erosion in the valve.

The control valve of FIG. 2 has a particular application as a constant area valve for varying the flow direction and consequently the reaction thrust between opposing nozzles. The nozzles may be connected to receive the fluid flowing from the ports 16 and 17. D.C. control signals are modulated by the pulse time modulator 15 of FIG. 1 at a predetermined frequency with the flapper 11 dwelling longer on one of the valve seats than on the other producing an average control force proportional to the modulating input signal. With a zero input signal the fluid will alternately flow through the ports 16 and 17 and to the connected nozzles for equal periods producing a zero net signal on the differential thrust nozzles.

The valve of the invention is relatively unaffected by tar and other impurities in the fluid due to the provision of large size ports 16 and 17. A screen may be utilized upstream of the valve in order to remove large solid particles.

Because of the pulse time modulator control utilized to control the fluid flow through the ports 16 and 17, precision calibration of the valve is not required. The entire gain of the valve may be established by the electronic modulating means rather than valve mechanical characteristics as required in valves of the present art. A relatively small amount of electrical power is required to move the flapper because of the pressure balancing of the forces in the cavity of the valve.

Although the invention has been described and illustrated in detail, it is to be clearly understood that the same is by way of illustration and example only and is not taken by way of limitation, the spirit and scope of this invention being limited only by the terms of the appended claims.

I claim:
1. In a solenoid actuated control valve,
a valve housing defining a substantially cylindrical cavity,
said cavity having a closed end portion and an open end portion,
means defining an inlet port communicating with and adjacent said open end portion,
said housing having a pair of oppositely disposed, axially aligned outlet ports communicating with lateral wall portions of said cavity in the region of the recited open end thereof,
flapper means flexibly mounted within said cavity in the region of its closed end and extending along the axis thereof so that its free end is disposed and adapted for movements toward and away from said oppositely disposed outlet ports to dwell thereon and provide communication of said inlet port alternately with one and then the other of said outlet ports,
and means including a pulse duration modulator for cyclically moving said flapper means transversely of the axis of said cylindrical cavity to control the dwell time on said outlet ports in accordance with an electrical control signal,
whereby the relative duration of the recited communication between said inlet port and each of said outlet ports is proportional to the dwell times of said flapper means on said oppositely disposed outlet ports.

2. In a single stage solenoid actuated control valve,
a valve housing defining a substantially cylindrical cavity,
said cavity having a closed end portion and an open end portion,
means defining an inlet port communicating with and adjacent said open end portion,
said housing having a pair of oppositely disposed, axially aligned outlet ports communicating with the lateral wall portions of said cavity in the region of the recited open end thereof,
an elongated magnetically permeable flapper mounted at one end thereof within said cavity, in the region of its closed end portion, and extending along the axis of the cavity so that the free end of the flapper is disposed and adapted for movements toward and away from said oppositely disposed outlet ports to provide communication of said inlet port alternately with one and then the other of said outlet ports, said flapper being free to dwell momentarily on the seats of said outlet ports,
electromagnetic means positioned adjacent the lateral walls of said cavity and adapted to cause said flapper to dwell alternately on the seats of said outlet ports, and
electrical control means including a pulse time modulator for actuating said electromagnetic means cyclically to move said flapper transversely of the axis of said cylindrical cavity in accordance with the control means, whereby the relative rates of flow through said outlet ports is proportional to the dwell times of said flapper on the seats of said outlet ports.

3. In a single stage solenoid actuated control valve,
a valve housing having a substantially cylindrical cavity open at one end and closed at the other,
a supply port communicating with the open end of said cavity,
a pair of outlet ports oppositely disposed in side wall portions of and communicating with said cavity, in the region of its open end, and each port having a seat,
a magnetically permeable flapper within said cavity and fixedly supported by said housing in the region of the closed end of the cavity and having its opposite end free and extending toward said open end and between the seats of said outlet ports, and having a spring rate whereby said flapper is normally centered between said seats,
a pair of oppositely poled electromagnets for causing said flapper to move transversely of the axis of said cavity and alternately dwell on the seats of said outlet ports, and
electrical control means for actuating said electromagnets in accordance with a predetermined time control signal whereby said flapper is caused to move and dwell on said seats for a time in accordance with said time control signal.

4. The combination recited in claim 3 wherein the free end of said flapper comprises a spherical poppet disposed and adapted to seat against said outlet ports.

References Cited by the Examiner

UNITED STATES PATENTS

| | | | | |
|---|---|---|---|---|
| 2,330,151 | 9/43 | Smith | 137—106 |
| 2,452,898 | 11/48 | Bourdette | 237—50 |
| 2,526,972 | 10/50 | Ray | 137—83 XR |
| 2,644,400 | 7/53 | Hofer | 137—624.11 XR |
| 2,770,248 | 11/56 | Audia | 137—624.18 XR |
| 2,775,254 | 12/56 | Stanbury | 137—83 XR |
| 2,864,394 | 12/58 | Hempel | 137—521 XR |
| 2,912,012 | 11/59 | Klinger | 137—625.44 |
| 2,944,558 | 7/60 | Dodge | 137—82 |
| 3,053,276 | 9/62 | Woodward | 137—83 XR |
| 3,057,373 | 10/62 | Bragg | 137—521 |
| 3,072,147 | 1/63 | Allen et al. | 137—83 XR |

LAVERNE D. GEIGER, *Primary Examiner.*

M. CARY NELSON, *Examiner.*